April 19, 1960  M. ZAIGER ET AL  2,932,843
WINDSHIELD WIPER ARM CONNECTOR
Filed Feb. 5, 1957  2 Sheets-Sheet 1
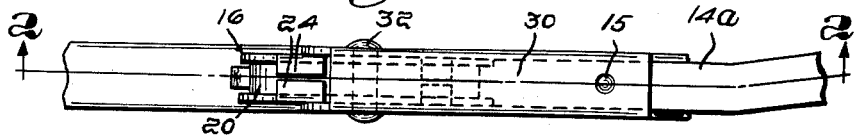
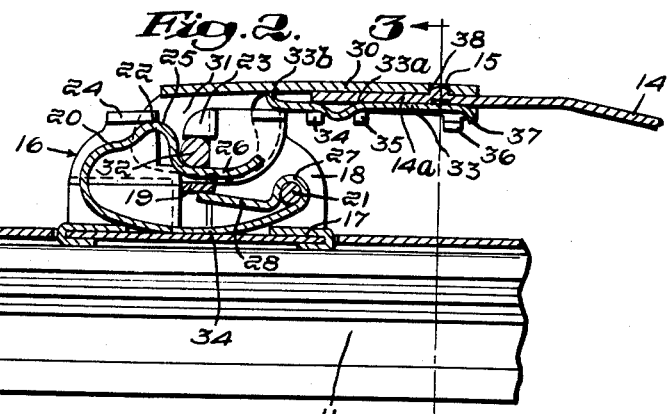
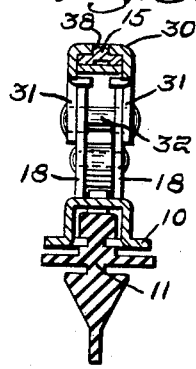
Inventors:
Max Zaiger,
Albert Zaiger,
by Arthur D. Thomson
Attorney April 19, 1960   M. ZAIGER ET AL   2,932,843
WINDSHIELD WIPER ARM CONNECTOR
Filed Feb. 5, 1957   2 Sheets-Sheet 2
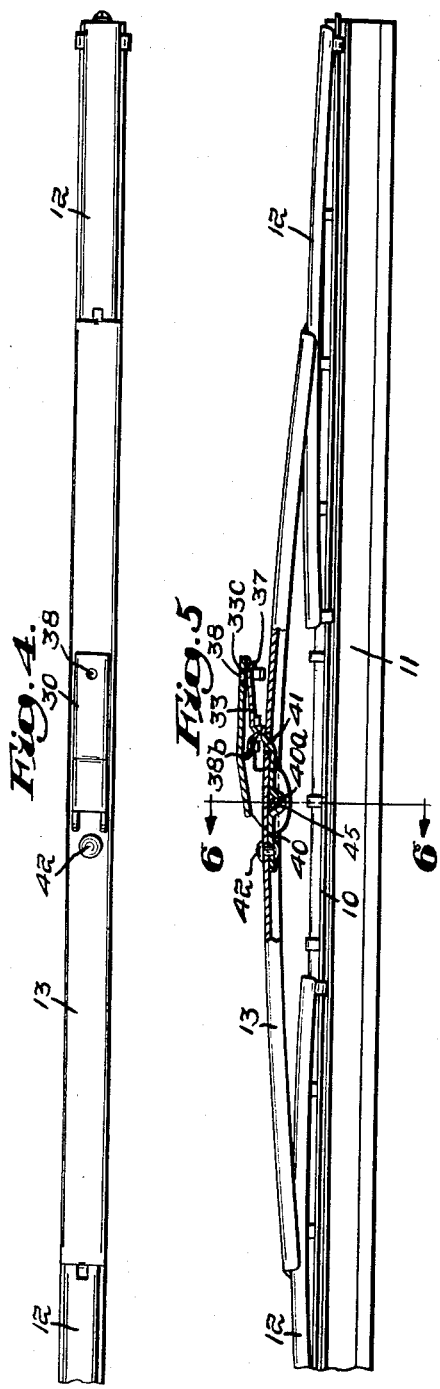
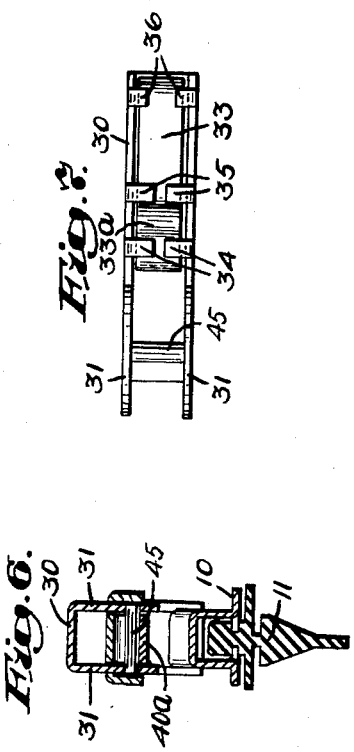
Inventors:
Max Zaiger,
Albert Zaiger,
by Arthur D. Thomas
Attorney

United States Patent Office 2,932,843
Patented Apr. 19, 1960

2,932,843

WINDSHIELD WIPER ARM CONNECTOR

Max Zaiger and Albert Zaiger, Lynn, Mass.

Application February 5, 1957, Serial No. 638,244

4 Claims. (Cl. 15—250.32)

This invention relates in general to connectors for attaching a windshield wiper arm to a wiper blade, and more particularly to connectors for receiving a wiper arm having a bayonet type of end.

A universal wiper clip, suitable for receiving four common types of wiper arms, is disclosed in Patent No. 2,709,825 to Nesson. The four types of arm ends which the Nesson universal connector will receive are the spoon type, the cross-bar type, the hook type, and the slotted terminal type. Another type of arm which is now on the market, referred to as the "bayonet" type, has a flat end with a flattened stud on one side.

The principal object of this invention is to provide a simple and effective connector for the bayonet type of arm, which holds the arm firmly, and has a locking device for engaging the stud to prevent accidental dislodgement of the blade, but which, nevertheless, permits the blade to be removed and replaced on the arm quickly and without the use of special tools. Another object is to provide a connector which can be used either as an adapter on blades equipped with clips of the kind described in the aforesaid patent, or as a permanently attached connector on new blades. Other advantages of the improved connector will be apparent from the following description.

In the drawings illustrating the invention:

Fig. 1 is a plan view of the connector used as an adapter, parts of the arm and blade being broken away;

Fig. 2 is a cross-section taken along line 2—2 of Fig. 1;

Fig. 3 is a cross-section taken along line 3—3 of Fig. 2;

Fig. 4 is a plan view of a blade with the connector permanently attached;

Fig. 5 is a side view of the blade of Fig. 4, the connector and part of the blade yoke being shown in cross-section;

Fig. 6 is a cross-section along line 6—6 of Fig. 5; and

Fig. 7 is a bottom view of the connector, somewhat enlarged.

The wiper blade here illustrated is of the flexible type consisting of a metal shell or backer strip 10, on which is mounted the rubber wiper strip 11, a pair of secondary yokes 12 attached to the shell, and a channel-shaped primary yoke 13 pivotally attached to the secondary yokes. It is understood that the connector may be mounted on other types of blades. The arm 14 is of generally rectangular cross-section throughout, including the end portion 14a, and carries a round flat stud 15 on the outer side of end portion 14a.

In Figs. 1 through 3, a universal clip, generally indicated by the numeral 16, of the type described in Patent No. 2,709,825, is mounted on the yoke 13. This clip consists of a body having a base 17 attached to yoke 13, and upstanding side walls 18, a bridge member 19, and a leaf spring 20, secured to the clip body by a pin 21. The walls 18 have upwardly opening slots 22, carrying inwardly bent fingers 23 partially overhanging the slots, and also carrying inwardly bent flanges 24. Spring 20 has a bow portion 25 which is normally engaged under flanges 24, and a tail portion 26 which rests on top of bridge 19. The spring is bent back on itself and has a bight portion 27, which passes around pin 21, and an end 28 which engages under bridge 19.

The connector has a channel-shaped body 30, with depending legs 31 to which is attached a cross-bar 32. A leaf spring 33 is mounted in body 30 and secured by means of pairs of tabs 34, 35 and 36, which are formed integrally with the body and bent over after the spring is assembled in place. The spring has a bowed portion 33a which seats between tabs 34 and 35, and the spring, as a whole, is bowed so that its end portions 33b and 33c normally engage the body 30, before the arm is inserted, as shown in Fig. 5. The spring has a downturned lip 37 at its right-hand end. Body 30 is provided with a hole 38 for receiving stud 15.

When the connector is used as an adapter for clip 16, as shown in Figs. 1 through 3, cross-bar 32 is inserted through slots 22 of the clip and is engaged between fingers 23 and spring 20 in the same manner as the cross-bar type of arm. Legs 31 engage the outside of walls 18 to prevent the connector from rocking sidewise, but the connector can pivot with respect to the clip about the axis of bar 32. To assemble the blade to the arm, the end portion 14a of the arm is pushed in between spring 33 and body 30 until stud 15 snaps into place in hole 38. The downturned lip 37 facilitates insertion of the arm end, and it will be noted that tabs 36 have enough clearance to permit passage of the stud between the spring and the body. To remove the arm, the right-hand end of spring 33 can be depressed to free stud 15 from hole 38. The blade can thus be assembled on the arm and removed very readily without tools, but is securely held against accidental dislodgement.

When the connector is used on a blade made specifically for use with a bayonet type of arm, the connector is permanently assembled on to yoke 13 in the manner shown in Figs. 4 through 6. The yoke 13 is slotted to receive legs 31. In this case a cross-bar 45 is assembled on to the legs after the latter have been passed through the yoke. Cross-bar 45 may, for example, be a headed rivet but is here shown as a pin inserted through holes in legs 31 and held in place by the side walls of the yoke 13. The cross-bar is then secured against the top wall of yoke 13 by a strap 40 which has a bowed portion 40a, in which the cross-bar is received, and a tongue 41 which passes through a hole in the yoke. After the tongue is engaged with the yoke, strap 40 is permanently secured by a rivet 42.

Cross-bar 45 can rotate freely in this arrangement. The long bearing surface provided by strap 40, however, insures long wear of the pivot joint, and proper alignment of the connector with the blade. This connection is superior, for example, to a pivot joint using holes in the yoke as bearings, because, as the holes wear, an undesirable amount of play develops between the connector and the blade and, consequently, between the blade and the arm. The transverse bearing contact between pin 45 and strap 40 extends the full width of strap 40, and the contact area is thus considerably greater than would be obtainable by using holes in the relatively thin side walls of the yoke. The pivot joint in the improved construction will remain sufficiently true for proper operation over a long period because the wear is distributed over a relatively large area.

The arm is assembled to the permanent connector by inserting end 14a between body 30 and lip 37, and pushing the arm in until stud 15 locks in hole 38, as previously described.

What is claimed is:

1. A windshield wiper arm connector for connecting an arm having an end portion with a stud thereon to a wiper blade having a generally channel-shaped holder with a back wall and side walls, comprising: a body having a pair of legs disposed generally parallel to said side walls, said back wall having openings through which said legs pass, a leaf spring mounted on said body, said end portion being slidably received between said spring and said body, said body having an opening in which said stud is engaged, a cylindrical cross-bar disposed transversely between and engaged with said legs, and a strap mounted against said back wall, said strap having a bowed portion having a substantial area of engagement with said bar and said bar being rotatably seated between said bowed portion and said back wall.

2. A connector as described in claim 1, said legs having oppositely disposed holes, and said cross-bar comprising a pin slidably received in said holes.

3. A windshield wiper arm connector for connecting an arm to a generally channel-shaped holder with a back wall and side walls, comprising: a body connected to said arm and having a pair of spaced legs disposed generally parallel to said side walls, said back wall having openings through which said legs pass, a cylindrical cross-bar disposed transversely between and engaged with said legs, and a strap mounted against said back wall, said strap having a bowed portion embracing said bar substantially from one of said legs to the other, said bar being rotatably seated between said bowed portion and said back wall.

4. A windshield wiper arm connector for connecting an arm having a substantially flat end portion with a stud thereon to a wiper blade, comprising: a body connected to said blade having a substantially flat back wall, a leaf spring disposed substantially parallel to said wall, said end portion being slidably engaged between said spring and said wall, said wall having an opening in which said stud is received, said spring having a first end tongue extending toward and engaging said wall and a second end tongue extending away from said wall, said end portion being insertable between said wall and said second end tongue, said body having spaced tabs, and said spring having a bowed portion intermediate said tongues disposed between said tabs.

References Cited in the file of this patent
UNITED STATES PATENTS

| | | |
|---|---|---|
| 2,632,908 | Krohm | Mar. 31, 1953 |
| 2,643,410 | Nesson | June 30, 1953 |
| 2,666,226 | Rappl | Jan. 19, 1954 |
| 2,676,351 | Nesson | Apr. 27, 1954 |
| 2,747,213 | Oshei | May 29, 1956 |
| 2,756,454 | Nesson | July 31, 1956 |
| 2,806,241 | Oshei | Sept. 17, 1957 |